US008510368B2

(12) United States Patent
Chor (10) Patent No.: US 8,510,368 B2
(45) Date of Patent: Aug. 13, 2013

(54) SHORT URI PAYLOAD-STATUS SYSTEMS AND METHODS

(75) Inventor: Jesse Chor, Bellevue, WA (US)

(73) Assignee: Mskynet Inc., Seattle, WA (US)

( * ) Notice: Subject to any disclaimer, the term of this patent is extended or adjusted under 35 U.S.C. 154(b) by 280 days.

(21) Appl. No.: 12/908,595

(22) Filed: Oct. 20, 2010

(65) Prior Publication Data
US 2012/0102087 A1 Apr. 26, 2012

(51) Int. Cl.
*G06F 15/16* (2006.01)
(52) U.S. Cl.
USPC .......................... 709/202; 709/201; 709/203
(58) Field of Classification Search
USPC .................................................. 709/201–203
See application file for complete search history.

(56) References Cited

U.S. PATENT DOCUMENTS

| 6,694,333 B2 * | 2/2004 | Oldham ................................. | 1/1 |
| 2011/0295990 A1 * | 12/2011 | St. Jean et al. ................. | 709/223 |
| 2012/0047577 A1 * | 2/2012 | Costinsky ....................... | 726/22 |

OTHER PUBLICATIONS

Kincaid J, "Google Continues to Embrace QR Codes, Integrates Them Into Its URL Shortener," web article, http://techcrunch.com/2010/09/20/techcrunch-disrupt-next-week-heres-the-agenda-of-awesome, Apr. 7, 2010.
"Technical Information: How long will shortened URLs be?" web article, http://is.gd/tech.php, 2010.
"Link Valet," web-based linkage site, WebDesignGroup, http://www.weberdesigngroup.com, 2010.
"Xenu's Link Sleuth," website, http://home.snafu.de/tilman/xenulink.html, Jun. 15, 2010.
Philip, "Best Free Web Site Link Checker," web article, http://www.techsupportalert.com/best-free-web-site-link-checker.htm, Apr. 30, 2010.
"SEO Scripts," business website, http://www.seoscripts.net, 2010.

* cited by examiner

*Primary Examiner* — Mohamed Wasel
(74) *Attorney, Agent, or Firm* — Æon Law; Adam L. K. Philipp (57) ABSTRACT

A short URI, provided by a server on behalf of a third party, may be evaluated by selecting a device agent associated with the short URI and determining a destination URI corresponding to the device agent and the short URI, the destination URI identifying a payload. The server requests the payload and determines a current payload status by evaluating characteristics of the response against response characteristics that are expected based at least in part on a payload type of the payload. A payload status report is provided to the third party indicating the determined current payload status.

21 Claims, 8 Drawing Sheets

SHORT URI PAYLOAD-STATUS SYSTEMS AND METHODS

FIELD

The present disclosure relates to networked computing, and more particularly, to systems and methods for determining current statuses of one or more short URIs.

BACKGROUND

URL shortening is a technique on the World Wide Web in which a target Uniform Resource Locator ("URL") or other Uniform Resource Identifier ("URI") may be aliased to a "short" URL that redirects or forwards from an URL-shortening service to the target URL or URI. Short URLs are frequently provided by URL-shortening services on behalf of a number of third-party clients. In some cases, it may be difficult for such URL-shortening services and/or their clients to monitor current statuses of their various short URLs in the dynamic environment of the World Wide Web.

DESCRIPTION

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file Servers, computer Servers, and memory storage devices. Each of these conventional distributed computing components is accessible by the processor via a communication network.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein.

Figure 1:
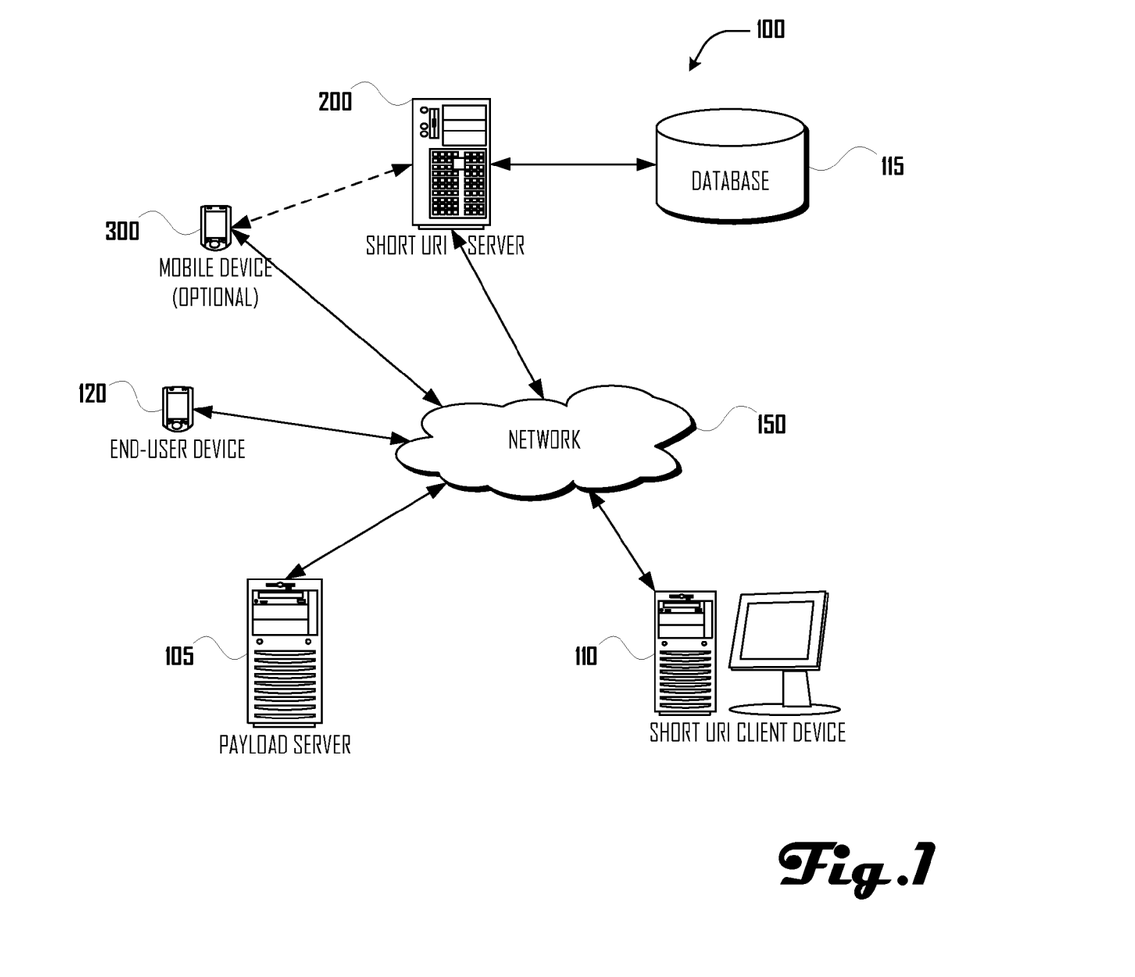
FIG. 1 illustrates an exemplary "short" URI status monitoring system according to one embodiment.

FIG. 1 illustrates an exemplary "short" URI status monitoring system 100 according to one embodiment in which an optional mobile device 300 (see FIG. 3, discussed below) and short-URI server 200 (see FIG. 2, discussed below) are connected to a network 150. In some embodiments, a short-uri-client device 110, end-user device 120, and payload server 105 are also connected to network 150, and short-uri server 200 is in communication with database 115 (which may also be connected to network 150 in some embodiments). In some embodiments, optional mobile device 300 may also be in direct communication with short-uri server 200.

In some embodiments, other servers and/or devices (not shown) may also be present. For example, in some embodiments, one or more proxy devices, firewalls, and/or other intermediaries (not shown) may exist between short-uri server 200 and some or all of payload server 105 and short-uri-client device 110.

In some embodiments, short-uri server 200 may communicate with database 115 via network 150, a storage area network ("SAN"), a high-speed serial bus, and/or via other suitable communication technology. In some embodiments, short-uri server 200 and/or database 115 may comprise one or more replicated and/or distributed physical or logical devices.

In various embodiments, network 150 may include the Internet, a local area network ("LAN"), a wide area network ("WAN"), a cellular data network, and/or other data network. In many embodiments, there may be more mobile devices 300, end-user devices 120, payload servers 105, and/or short-uri-client devices 110 than are illustrated.

In some cases, an URL-shortening service may use "short" URIs for encoding into two-dimensional barcodes (e.g., QR Codes, Data Matrix codes, High Capacity Color Barcodes, and the like). Users with a camera phone or other end-user device 120 equipped with an appropriate reader application can scan the image of the two-dimensional barcode to display text, contact information, connect to a wireless network, open a webpage in the phone's browser, and/or perform other operations.

In one embodiment, an URI-shortening service may operate short-URI server 200 to provide services to third-party clients, including short-uri-client device 110. At the behest of short-uri-client device 110, short-URI server 200 may encode one or more two-dimensional barcodes with a "short" URL or URI that identifies a resource on short-URI server 200, but redirects to a destination URL or URI identifying a remote payload server 105.

For example, in one embodiment, short-URI server 200 may encode a "short" URL such as, "http://www.mskynet.com/r/2SWF", into a two-dimensional barcode. When the barcode is decoded (e.g. by end-user device 120) or a request is otherwise made for the "short" URL, short-URI server 200 may respond with a Hypertext Transfer Protocol ("HTTP") redirect identifying payload server 105, such as the following.

HTTP/1.1 302 Found
Content-length: 137
Content-Type: text/html; charset=utf-8
Location:
http://en.wikipedia.org/w/index.php?title=SPARQCode&oldid=382505033
Status: 302

In some cases, the destination URL or URI to which a "short" URI redirects may be subject to further redirection and/or forwarding before a final destination URL or URI may be reached. In addition, in some cases a destination URL or URI may differ depending on the type of client that is making the request. For example, in one embodiment, a "short" URI may ultimately resolve to identify an iPhone application when the "short" URI is requested by an iPhone device, but may ultimately resolve to an Android version of the same application when the same "short" URI is requested by an Android device.

In some cases, short-URI server 200 may provide dozens, hundreds, or even thousands of two-dimensional barcodes and/or "short" URIs on behalf of any one of the service's third-party clients (e.g., short-uri-client device 110). In some cases, it may be difficult or impracticable for such a third-party client to manually test a number of barcodes and/or "short" URIs to ensure that they properly resolve on a variety of end-user devices.

In various embodiments, short-URI server 200 may use some or all of the disclosure provided herein to provide to such clients automatic status reports identifying two-dimensional barcodes and/or "short" URIs that may be broken or otherwise requiring attention.

As the term is used herein, "short" URI refers to an URI identifying a resource on short-URI server 200, such that short-URI server 200 responds to requests for the identified resource by redirecting the requestor to a destination URI on a remote server not operated by the URI-shortening service. The redirection mechanism may include a 3xx HTTP status code or other suitable redirection and/or forwarding scheme. In many embodiments, a "short" URI may be relatively concise, but a "short" URI need not be literally shorter than the destination to which it redirects, nor even to the ultimate destination (if different from the initial destination). For example, in one embodiment, a "short" URI may redirect to a shortened URI from another URI-shortening service.

Figure 2:
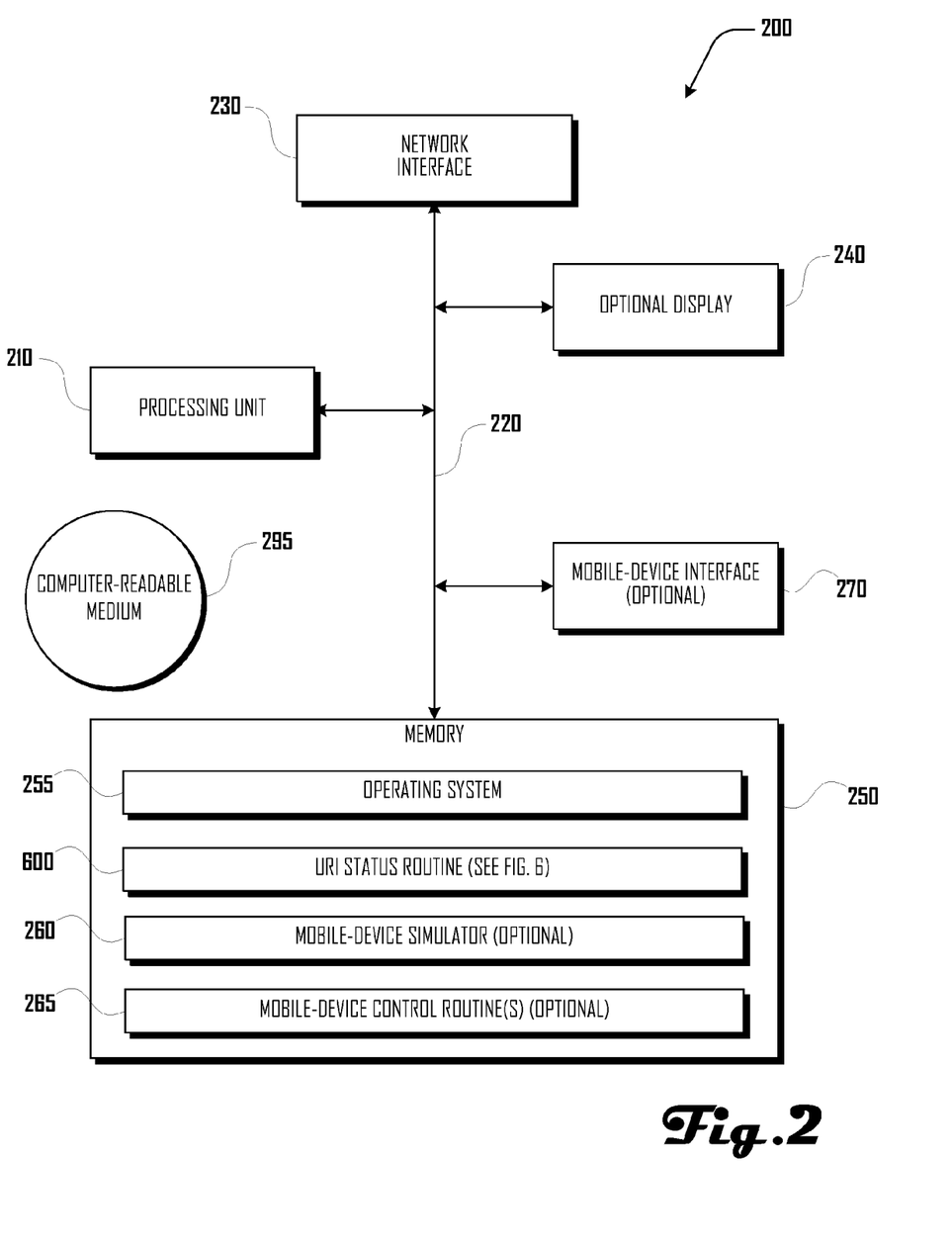
FIG. 2 illustrates several components of an exemplary short-uri server in accordance with one embodiment.

FIG. 2 illustrates several components of an exemplary short-uri server 200 in accordance with one embodiment. In some embodiments, short-uri server 200 may include many more components than those shown in FIG. 2. However, it is not necessary that all of these generally conventional components be shown in order to disclose an illustrative embodiment. As shown in FIG. 2, short-uri server 200 includes a network interface 230 for connecting to the network 150.

The short-uri server 200 also includes a processing unit 210, a memory 250, and an optional display 240, all interconnected along with the network interface 230 via a bus 220. The memory 250 generally comprises a random access memory ("RAM"), a read only memory ("ROM"), and a permanent mass storage device, such as a disk drive. The memory 250 stores program code for a URI status routine 600 (see FIG. 6, discussed below), an optional mobile-device simulator 260, and an optional mobile-device control routines 265 for optionally controlling optional mobile device 300. In addition, the memory 250 also stores an operating system 255. These software components may be loaded from a computer readable storage medium 295 into memory 250 of the short-uri server 200 using a drive mechanism (not shown) associated with a non-transient computer readable storage medium 295, such as a floppy disc, tape, DVD/CD-ROM drive, memory card, or the like. In some embodiments, software components may also be loaded via the network interface 230, rather than via a computer readable storage medium 295.

Figure 3:
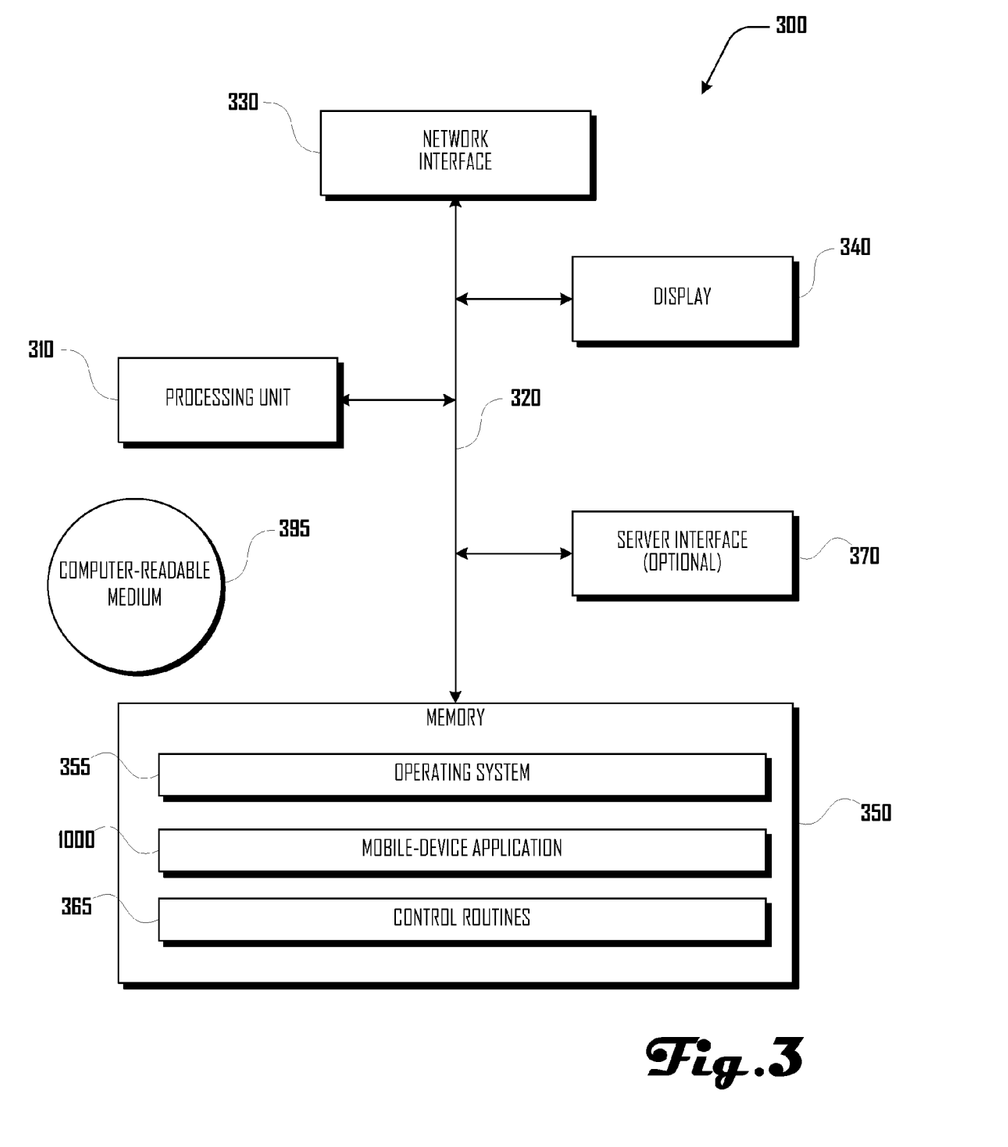
FIG. 3 illustrates several components of an exemplary mobile device in accordance with one embodiment.

In some embodiments, short-uri server 200 may further comprise a specialized interface (not shown) for communicating with database 115, such as a high-speed serial bus, or the like. In some embodiments, short-uri server 200 may communicate with database 115 via network interface 230. In other embodiments, database 115 may reside in memory 250. In some embodiments, short-URI server 200 may also include mobile-device interface 270 for controlling optional mobile device 300 via mobile-device control routines 265. For example, in one embodiment, mobile-device interface 270 may comprise a Universal Serial Bus (USB) or other serial or parallel bus.

Although an exemplary short-uri server 200 has been described that generally conforms to conventional general purpose computing devices, an short-uri server 200 may be any of a great number of devices capable of communicating with the network 150, database 115, and/or clients 300A-C, for example, a personal computer, a game console, a set-top box, a handheld computer, a cell phone, or any other suitable device.

FIG. 3 illustrates several components of an exemplary mobile device 300 in accordance with one embodiment. In some embodiments, mobile device 300 may include many more components than those shown in FIG. 3. However, it is not necessary that all of these generally conventional components be shown in order to disclose an illustrative embodiment. As shown in FIG. 3, mobile device 300 includes a network interface 330 for connecting to the network 150.

The mobile device 300 also includes a processing unit 310, a memory 350, and a display 340, all interconnected along with the network interface 330 via a bus 320. The memory 350 generally comprises a random access memory ("RAM"), a read only memory ("ROM"), and a permanent mass storage device, such as a disk drive, flash memory, or other persistent storage technology. The memory 350 stores program code for a one or more control routines 365 for being controlled by short-URI server 200 via optional interface 370. For example, in one embodiment, interface 270 may comprise a Universal Serial Bus (USB) or other serial or parallel bus. In addition, the memory 350 also stores an operating system 355. These software components may be loaded from a computer readable storage medium 395 into memory 350 of the mobile device 300 using a drive mechanism (not shown) associated with a non-transient computer readable storage medium 395, such as a floppy disc, tape, DVD/CD-ROM drive, memory card, or the like. In some embodiments, software components may also be loaded via the network interface 330, rather than via a computer readable storage medium 395.

Although an exemplary mobile device 300 has been described that generally conforms to conventional general purpose computing devices, an mobile device 300 may be any of a great number of devices capable of communicating with the network 150 and/or short-uri server 200, for example, a personal computer, a game console, a set-top box, a handheld computer, a cell phone, or any other suitable device.

Figure 4:
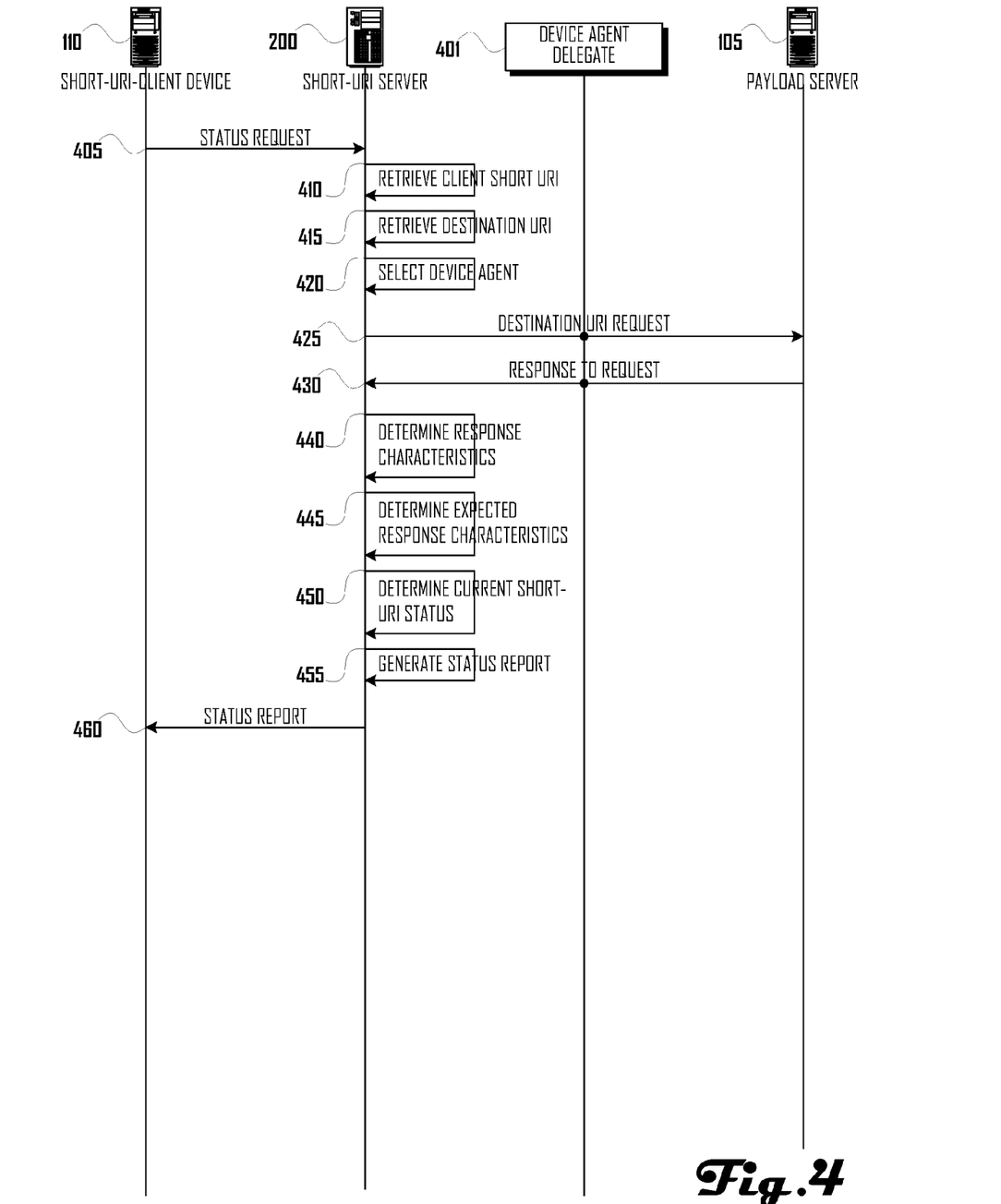
FIG. 4 illustrates a sequence of data communications for generating an exemplary report on the status of a "short" URI, in accordance with one embodiment.

FIG. 4 illustrates a sequence of data communications for generating an exemplary report on the status of a "short" URI, in accordance with one embodiment. Short-uri-client device 110 sends status request 405 to short-uri server 200. In other embodiments, a status report may be generated automatically without prompting by short-uri-client device 110. In some embodiments, a status report may include statuses for a number of "short" URIs.

Short-URI server 200 retrieves at least one "short" URI 410 provided by short-URI server 200 on behalf of short-uri-client device 110 (e.g., from database 115) and retrieves at least one destination URI 415 (e.g., from database 115) associated with the "short" URI.

In some embodiments, the "short" URI may have different associated destination URIs, depending on the type of device making a request. Accordingly, short-URI server 200 determines at least one device agent 420 associated with the "short" URI. In various embodiments, a "device agent" may identify a particular application and/or type of device that is expected to request and/or handle the "short" URI from short-URI server 200. For example, in one embodiment, a device agent may identify a particular web browser (and/or a particular version of a web browser) that runs on a particular type of mobile device (e.g., Mobile Safari, which is the web browser provided with iPhone, iPod Touch, iPad, and other iOS devices from Apple Inc. of Cupertino Calif.). In other embodiments, a device agent may identify a non-web-browser application (e.g., an application-store application, a geographical-maps application, and the like) that runs on a particular type of mobile device (e.g., iOS devices; Android operating system devices, provided by Google Inc. of Menlo Park, Calif.; BlackBerry devices, provided by Research In Motion Limited of Waterloo, Ontario; webOS devices, provided by Palm, Inc. of Sunnyvale, Calif.; Symbian OS devices, provided by Nokia Corporation of Tempere, Finland; and the like). In some embodiments, the device agent may be a property associated with the "short" URI, e.g., in database 115. In other embodiments, the device agent may be determinable according to the destination URI (e.g., the destination URI may have a scheme or protocol associated with a particular device and/or application).

In some embodiments, the destination URI known to short-URI server 200 may be further redirected and/or forwarded before reaching payload server 105. Accordingly, short-URI server 200 sends a request 425 for a resource identified by the destination URI via a device agent "delegate" 401, or some process or device that stands in for the selected device agent. As discussed further below, in some embodiments, sending the request via device delegate 401 may comprise simply spoofing a user-agent associated with a particular version of a particular web browser. In other embodiments, sending the request via device delegate 401 may comprise mimicking or simulating all or part of a mobile device or application. In other embodiments, sending the request via device delegate 401 may comprise controlling an external device (e.g., mobile device 300) of a type associated with the selected device agent.

Short-URI server 200 receives a response 430 to the request via device agent delegate 401. Short-URI server 200 determines one or more response characteristics 440 associated with the response. For example, in some embodiments, the response characteristics may include an error or time-out condition associated with the response. In other embodiments, the response characteristics may include information about a payload ultimately identified by the destination URI (e.g., a type of the payload, a size of the payload, a version of the payload, one or more requirements of the payload, content included within the payload, and the like).

Short-URI server 200 determines one or more expected response characteristics 445 (e.g., type, size, version, requirements, content, and the like) that would indicate that the "short" URI is in an acceptable status condition. For example, in one embodiment, expected response characteristics may include that a payload is successfully received, and it's content indicates that the payload refers to version "X" of mobile application "Y."

Short-URI server 200 compares the actual response characteristics to the expected response characteristics to determine a current status 450 of the "short" URI. For example, in one embodiment, an actual response characteristic may include an error condition, whereas the corresponding expected response characteristic includes a successfully payload receipt condition, so short-URI server 200 may determine an "unacceptable" or "error" current status for the "short" URI. In another embodiment, an actual response characteristic may be that version "X.1" of an application was received as a payload, whereas the version "X.0" was expected, so short-URI server 200 may determine a "warning" or "attention required" status for the "short" URI. In still other embodiments, the actual and expected response characteristics may match, so short-URI server 200 may determine an "acceptable" or "OK" current status for the "short" URI.

Short-URI server 200 generates a status report 455 including the determined status for the "short" URI and sends the status report 460 for display on short-uri-client device 110.

Figure 5:
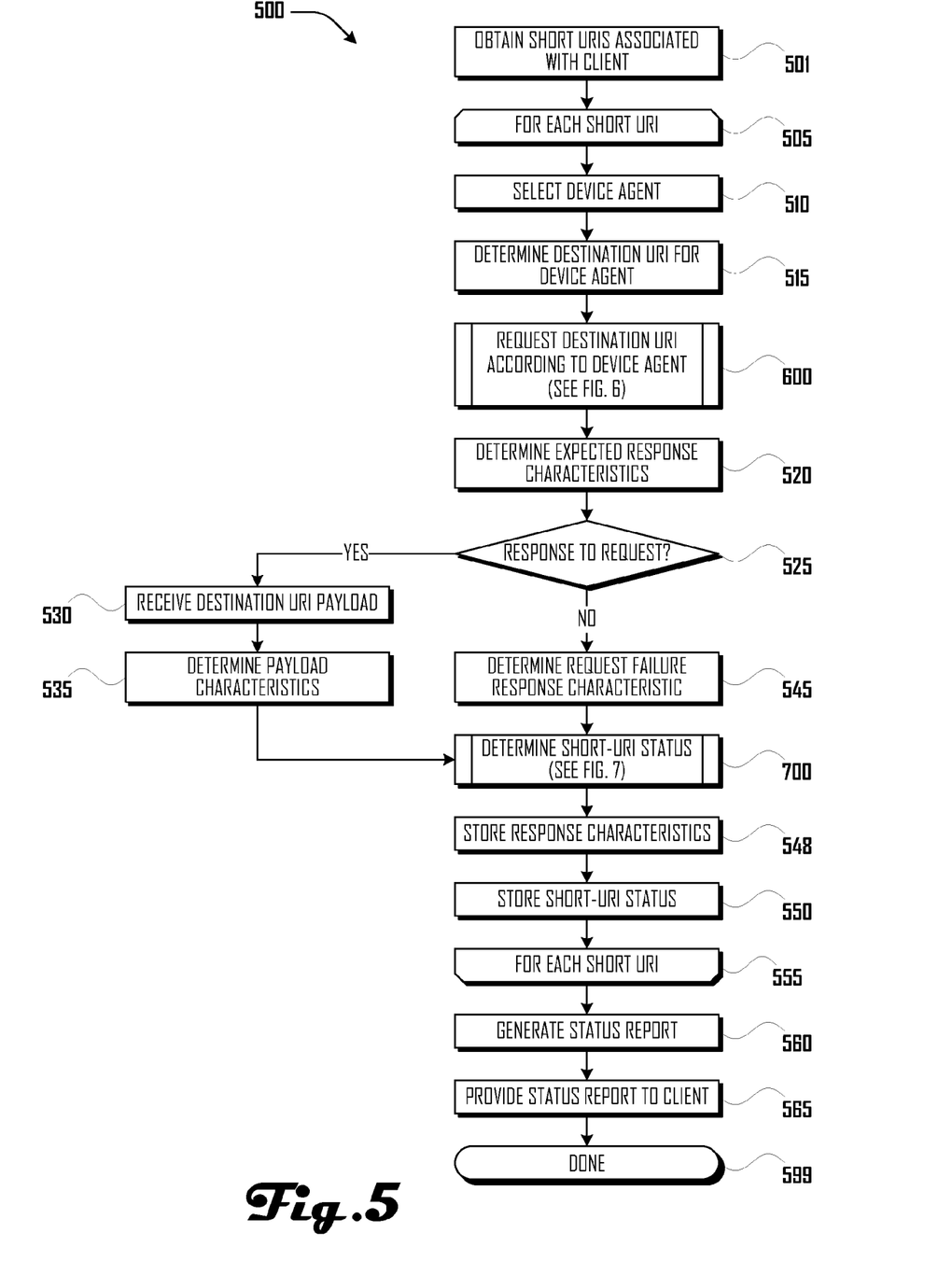
FIG. 5 illustrates a "short" URI monitoring routine in accordance with one embodiment.

FIG. 5 illustrates a "short" URI monitoring routine 500 in accordance with one embodiment. In some embodiments, routine 500 may be performed by short-uri server 200 periodically and/or on-demand. In block 501, routine 500 obtains (e.g., from database 115) a plurality of "short" URIs associated with a particular short-URI client. In some embodiments, the plurality of "short" URIs associated with a particular short-URI client may be selected from among a multiplicity of "short" URIs provided on behalf of a number of different clients.

Beginning in starting block 505, routine 500 processes each "short" URI. In block 510, routine 500 selects a device agent associated with the current "short" URI, and in block 515, routine 500 determines a destination URI corresponding to the current "short" URI and the selected device agent. As discussed above, in various embodiments, a "device agent" may identify a particular application and/or type of device that is expected to request and/or handle the "short" URI from short-URI server 200. In some embodiments, routine 500 may select the device agent from a plurality of device agents (e.g., stored in database 115). For example, in one embodiment, a device agent may identify a particular web browser (and/or a particular version of a web browser) that runs on a particular type of mobile device. In other embodiments, a device agent may identify a non-web-browser application that runs on a particular type of mobile device. In some embodiments, the device agent may be a property associated with the "short" URI, e.g., in database 115. In other embodiments, the device agent may be determinable according to the destination URI (e.g., the destination URI may have a scheme or protocol associated with a particular device and/or application). In some embodiments, the current "short" URI may be associated with only a single device agent and a single destination URI. In other embodiments, the current "short" URI may be associated with multiple device agents, each with an associated destination URI. In such embodiments, routine 500 may repeat some or all of blocks 600, 700, and 520-550 for each device agent.

In subroutine block 600, routine 500 calls subroutine 600 (see FIG. 6, discussed immediately below) to request the determined destination URI according to the selected device agent.

Figure 6:
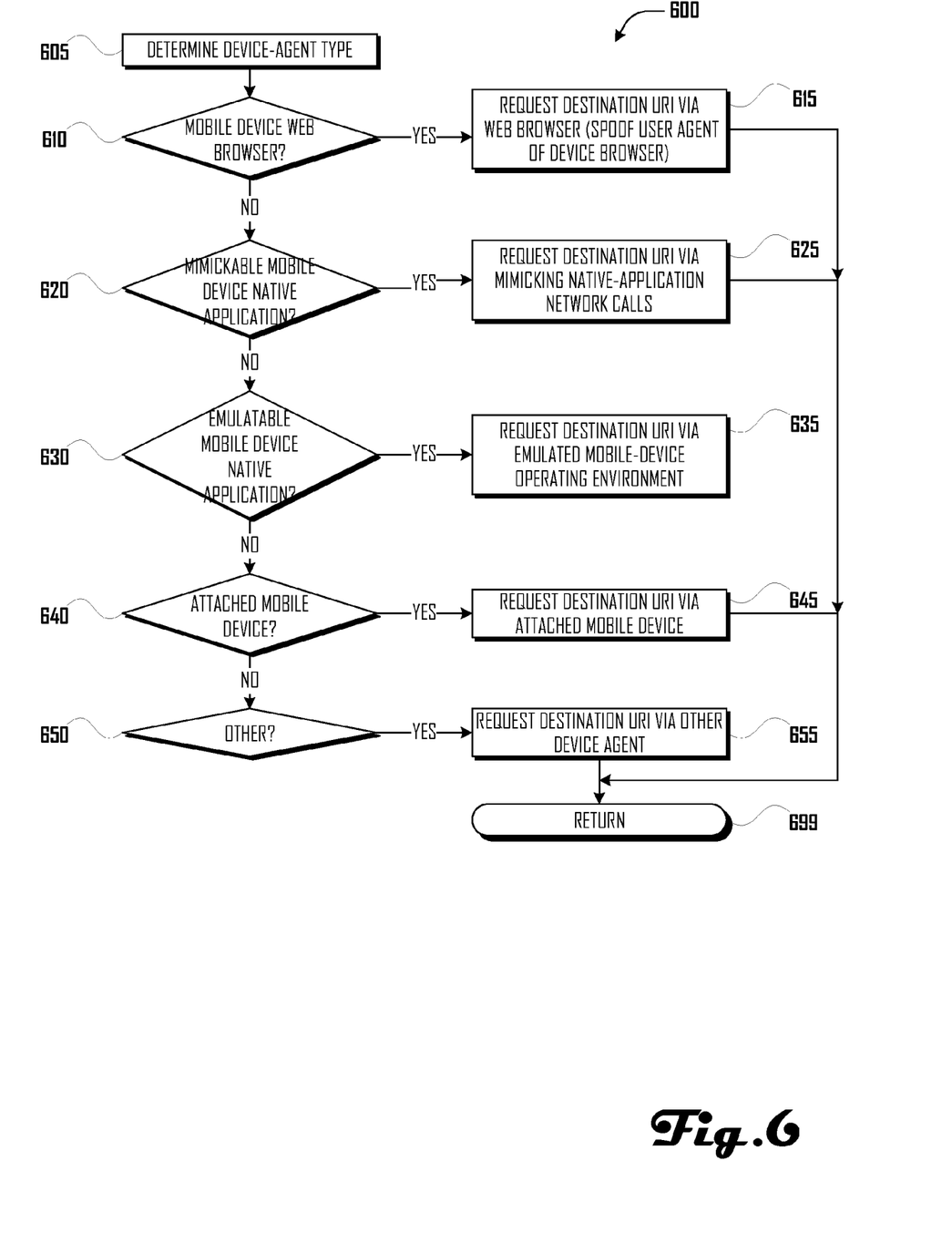
FIG. 6 illustrates a destination URI request subroutine in accordance with one embodiment.

FIG. 6 illustrates a destination URI request subroutine 600 in accordance with one embodiment. In block 605, subroutine 600 determines a device-agent type associated with the destination URI and device agent.

If in block 610 subroutine 600 determines that the device-agent type is that of a mobile-device web browser, then in block 615, subroutine 600 requests the destination via a web browser by "spoofing" the user-agent string of the mobile-device web browser (e.g., the web browser sending to the destination server a user-agent string identifying the web browser as the mobile-device web browser).

If, in block 620, subroutine 600 determines that the device-agent type is that of a mobile-device application that subroutine 600 is capable of mimicking, then in block 625, subroutine 600 requests the destination URI by mimicking network calls that the mobile-device application would make when communicating with the destination server.

If, in block 630, subroutine 600 determines that the device-agent type is that of a mobile-device application that subroutine 600 can execute via emulation, then in block 635, subroutine 600 requests the destination URI by emulating all of part of a mobile-device operating environment, including emulating the mobile-device application. Subroutine 600 instructs the emulated mobile-device application to request the destination URI and observes any responses sent to the emulated environment. For example, in one embodiment, subroutine 600 may request the destination URI via an application running in a mobile device emulator provided by the Android SDK, the iOS SDK, or the like.

If, in block 640, subroutine 600 determines that the device-agent type is that of a mobile-device application that subroutine 600 can control via an attached mobile device (e.g. mobile device 300), then in block 645, subroutine 600 requests the destination URI via a mobile-device application on the attached mobile device. Subroutine 600 instructs the mobile-device application on the attached mobile device to request the destination URI and observes any responses sent to the on the attached mobile device. For example, in one embodiment, subroutine 600 may request the destination URI via an application running on an attached Android device, iOS device, or the like.

If, in block 650, subroutine 600 determines that the device-agent type is of a type other than those disclosed above, then in block 655, subroutine 600 requests the destination via the device agent according to a suitable method. Subroutine 600 ends in block 699.

Referring again to FIG. 5, in block 520, routine 500 determines one or more expected response characteristics that would indicate that the determined destination URI is properly functioning. For example, in various embodiments, one or more of the expected response characteristics may be related to a payload (e.g., a web page, a mobile application or information from which a mobile application can be obtained, or other data) identified by the destination URI. For example, in various embodiments, expected response characteristics may include an expected type of the payload, an expected size of the payload, an expected version of the payload, an expected content item included within the payload, and the like.

In some embodiments, one or more expected response characteristics may be properties of the "short" URI (e.g., as stored in database 115). In some embodiments, one or more expected response characteristics may be derived at least in part based on previous responses to previous requests for the determined destination URI. For example, in one embodiment, if one or more previous requests for the determined destination URI resulted in a payload comprising version "X" of a mobile application, then an expected response characteristic may be that the payload be a mobile application having a version of "X".

In decision block 525, routine 500 determines whether a response was received to the request send in subroutine block 600. If no response was received (or if the only response received was an error), then in block 545, routine 500 determines a request-failure response characteristic for the request. If, however, a response was received, then in block 530, routine 500 receives a payload corresponding to the determined destination URI and the selected device agent. For example, in various embodiments, routine 500 may receive a payload web page, a payload mobile application, or other payload data.

In block 535, routine 500 determines one or more characteristics of the actual payload that correspond to the one or more expected response characteristics determined in block 520. In some embodiments, determining such characteristics may include determining a size, version, title, description, price, and/or other like characteristic of a mobile application payload. In other embodiments, determining such characteristics may include rendering an image of a web page payload or other renderable payload. In still other embodiments, determining such characteristics may include building a document object model ("DOM") for a Hyper Text Markup Language ("HTML") payload or other payload comprising machine-readable markup, such as Extensible Markup Language ("XML"), Extensible Hyper Text Markup Language ("XHTML"), or the like. Determining such characteristics may further include identifying one or more objects within the DOM that are expected to remain unchanged from one request to another.

In subroutine block 700 (see FIG. 7, discussed below), routine 500 determines a "short" URI status for the current determined destination URI and selected device agent. In some embodiments, in block 548, routine 500 stores some or all of the determined response characteristics for subsequent comparison with characteristics of a later-request of the current destination URI. In block 550, routine 500 stores (at least transiently) the determined status.

In ending loop block 555, routine 500 iterates back to block 505 to process the next "short" URI (if any). In block 560, routine 500 generates a status report showing the determined statuses for "short" URIs associated with the client. In block 565, routine 500 provides the status report to the client. Routine 500 ends in block 599.

Figure 7:
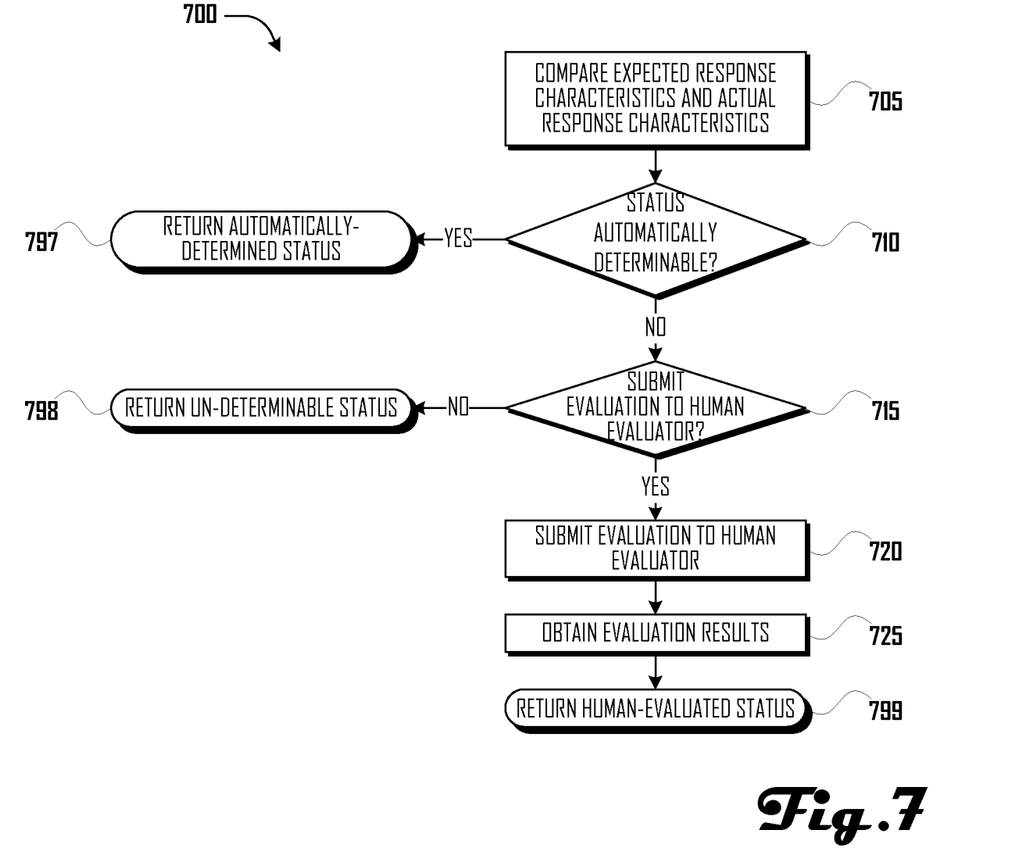
FIG. 7 illustrates a "short" URI status determination subroutine in accordance with one embodiment.

FIG. 7 illustrates a "short" URI status determination subroutine 700 in accordance with one embodiment. In block 705, subroutine 700 compares characteristics of an actually received response (if any) to a request for a destination URI against expected characteristics. For example, in some embodiments, comparing response characteristics may include comparing information about a mobile application payload, such as its size, version, title, requirements, description, price, and/or other like characteristic. In other embodiments, comparing response characteristics may include comparing particular objects within a DOM corresponding to a marked-up payload. In still other embodiments, comparing response characteristics may include comparing portions of rendered images of web pages or other renderable content.

In decision block 710, subroutine 700 determines whether a destination URI status is automatically determinable based on the comparison of response characteristics in block 705. For example, the actual response characteristics match the expected response characteristics, then an "acceptable" status may be automatically determinable. Similarly, if the actual response characteristics include a failure or error characteristic, then a "failure" status may be automatically determinable. When a destination URI status is automatically determinable, then subroutine 700 returns the automatically determined status in block 797.

When a destination URI status is not automatically determinable, then in decision block 715, subroutine 700 determines whether to submit the actual and expected response characteristics to a human evaluator. In some embodiments, no human evaluator may be employed for some or all non-automatically determinable statuses, and in block 798, an "un-determined" or "un-determinable" status may be returned to the caller. In such embodiments, the current destination URI may be flagged in a status report to indicate to the client that the client should look into a possible issue with the destination URI.

In other embodiments, a human evaluator may be employed for some or all non-automatically determinable statuses, and in block 720, the actual and expected response characteristics are submitted to a human evaluator. In some embodiments, such a human evaluator may work for the URI-shortening service whose device is executing subroutine 700, and the actual and expected response characteristics may be presented to a human operator on that device or on another device communicatively coupled with that device (either locally or via a network). In other embodiments, subroutine 700 may automatically "crowdsource" the evaluation to an online crowdsourcing marketplace, such as the Amazon Mechanical Turk, provided by Amazon.com, Inc. of Seattle Wash., or a similar service that enables subroutine 700 to automatically create a brief human intelligence task to be performed by an undetermined one (or more) of a plurality of remote human evaluators.

For example, in one embodiment, a payload provider may have altered the layout and/or formatting of a destination web page, such that the rendered page appears differently and/or elements within its DOM have been re-arranged or re-organized. In such an embodiment, subroutine 700 may automatically crowdsource the task of evaluating whether the altered destination page is substantively the same as the previous destination page.

In block 725, subroutine 700 obtains evaluation results from the human evaluator, which results are returned in ending block 799. In some embodiments, there may be a delay in obtaining evaluation results from the human evaluator. In some cases, subroutine 700 may defer returning a status until results are received. In other cases, subroutine 700 may initially return a "warning" or "evaluation in-progress" status, subsequently updating that status when an evaluation result is received. In such cases, a status report may also be subsequently updated and send to the client.

Figure 8:
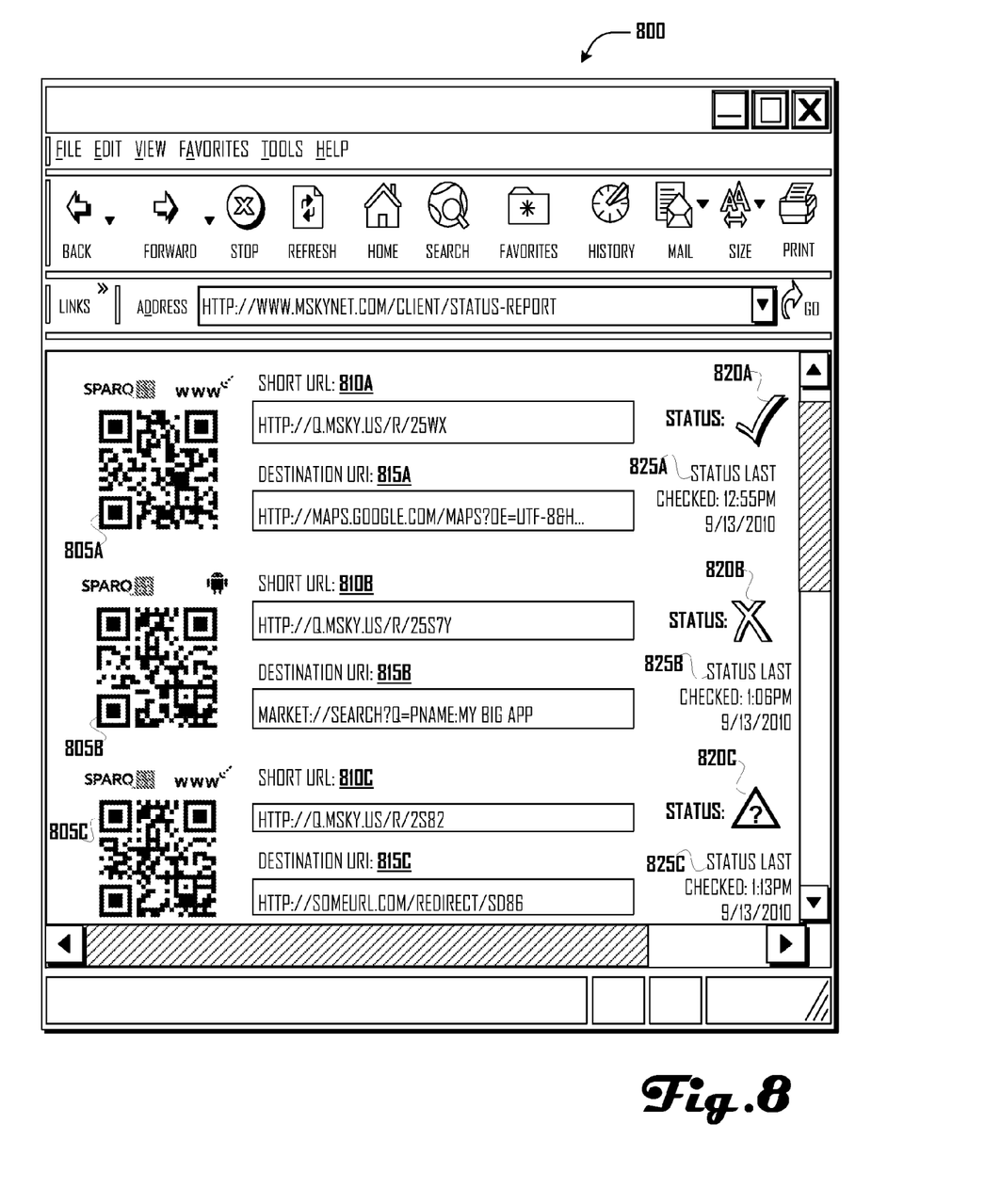
FIG. 8 illustrates an exemplary "short" URI status report, such as may be provided to a client of a URL-shortening service in accordance with one embodiment.

FIG. 8 illustrates an exemplary "short" URI status report 800, such as may be provided to a client of a URI-shortening service in accordance with one embodiment. In the illustrated embodiment, status report 800 is provided as a web page via a web browser. In other embodiments, status report 800 may be provided in other forms, such as via a client-side application or via an email message, SMS message, or other messaging system.

Status report 800 includes status indicators 820A-C for "short" URIs 810A-C, which correspond to destination URIs 815A-C. Status report 800 also includes images 805A-C, which depict machine-scannable codes into which "short" URIs 810A-C have been respectively encoded. Status report 800 also includes date/time stamps 825A-C, indicating when statuses 820A-C were respectively last determined. Status indicator 820A may indicate that "short" URI 810A was checked as time 825A and found to be in an "OK" or "acceptable" status. Status indicator 820B may indicate that "short" URI 810B was checked as time 825B and found to be in a "failure" or "error" status. Status indicator 820C may indicate that "short" URI 810C was checked as time 825C and found to be in a "warning" or "un-determined" status, indicating that the client may wish to investigate "short" URI 810C to ensure that it is behaving as intended. In other embodiments, status report 800 may include more, less, and/or different information.

Although specific embodiments have been illustrated and described herein, it will be appreciated by those of ordinary skill in the art that alternate and/or equivalent implementations may be substituted for the specific embodiments shown and described without departing from the scope of the present disclosure.

For example, in some embodiments, a URI-shortening service may further inspect destination URIs to ensure that "short" URIs provided by the service (e.g. via two-dimensional barcodes) do not lead to viruses, trojans, phishing sites, and the like. Thus, a URI-shortening service may implement monitoring systems and methods according to the disclosures provided herein to prevent its "short" URIs from acting as vectors of malware or other potentially harmful software.

Similarly, a URI-shortening service may further inspect destination URIs to ensure that "short" URIs provided by the service do not violate community standards that it and/or its client may wish to enforce, such as by leading to pornography or other potentially objectionable material. Such malware and/or objectionable material inspections may include inspecting content and payloads provided by destination URIs, looking up destination URIs in black lists and/or white lists, checking destination URIs with content rating services, and the like.

In some embodiments, a URI-shortening service may offer monitoring services, such as those disclosed herein, for a fee to those clients who may desire to pay for the service. In other embodiments, a URI-shortening service may generate status reports, such as described herein, on its own initiative, for one or more of the service's clients.

This application is intended to cover any adaptations or variations of the embodiments discussed herein.

The invention claimed is:

1. A server-implemented method of evaluating short URIs provided by the server on behalf of a third party, the method comprising:
    selecting, by the server from a multiplicity of short URIs provided by the server, a plurality of short URIs provided on behalf of the third party;
    for each of said plurality of short URIs:
        selecting, by the server, at least one device agent associated with the current short URI from a plurality of device agents;
        obtaining, by the server, a destination URI corresponding to said short URI and said at least one device agent, said destination URI identifying a payload associated with said at least one device agent;
        sending a request for said payload;
        determining, by the server, one or more expected response characteristics associated with said request based at least in part on a payload type of said payload; and
        determining, by the server, a current payload status associated with said short URI and said at least one device agent based at least in part on evaluating one or more actual response characteristics corresponding to said request according to said one or more expected response characteristics; and
    providing, by the server, a payload status report to the third party indicating said determined current payload statuses associated with said plurality of short URIs.

2. The method of claim 1, wherein said at least one selected device agent comprises a mobile-device web-browser user agent.

3. The method of claim 2, wherein sending said request for said payload comprises spoofing said mobile-device web-browser user agent.

4. The method of claim 1, wherein said at least one selected device agent comprises a mobile-device application.

5. The method of claim 4, wherein sending said request for said payload comprises the server mimicking a series of network communications as if said mobile-device application were communicating with a remote server hosting said payload.

6. The method of claim 4, wherein sending said request for said payload comprises the server executing a copy of said mobile-device application within an emulated mobile-device operating environment.

7. The method of claim 4, wherein sending said request for said payload comprises instructing a mobile device controlled by the server to request said payload via said mobile-device application executing on said mobile device.

8. The method of claim 1, further comprising retrieving said payload.

9. The method of claim 8, wherein determining said current payload status comprises comparing at least a portion of said payload to a corresponding portion of a previously retrieved payload associated with said destination URI.

10. The method of claim 8, further comprising storing at least said portion of said payload for comparison with a subsequently retrieved payload associated with said destination URI.

11. The method of claim 9, wherein said payload comprises a document comprising machine-readable markup.

12. The method of claim 11, wherein comparing at least said portion of said payload to said corresponding portion of said previously retrieved payload comprises building a payload document object model according to said machine-readable markup.

13. The method of claim 12, wherein comparing at least said portion of said payload to said corresponding portion of said previously retrieved payload further comprises comparing one or more elements within said payload document object model to one or more corresponding elements associated with said previously retrieved payload.

14. The method of claim 1, further comprising the server automatically submitting said evaluation of said one or more actual response characteristics to a human evaluator when said one or more actual response characteristics cannot be automatically determined to match or not match said one or more expected response characteristics.

15. The method of claim 14, wherein automatically submitting said evaluation of said one or more actual response characteristics to a human evaluator comprises crowdsourcing said evaluation of said one or more actual response characteristics to an undetermined one of a plurality of remote human evaluators.

16. The method of claim 14, further comprising receiving an evaluation response from said human evaluator and automatically updating said payload status report according to said evaluation response.

17. The method of claim 1, wherein said payload status report further comprises a plurality of images into which said plurality of short URIs have been respectively encoded as machine-scannable codes.

18. The method of claim 1, wherein said payload comprises data according to which a mobile device may obtain a mobile-device-executable application.

19. The method of claim 18, wherein said one or more expected response characteristics comprise at least one of an application-cost characteristic, an application-version characteristic, an application-title characteristic, an application-requirements characteristic, an application-title characteristic, and an application-description characteristic.

20. A non-transient computer-readable storage medium having stored thereon instructions that, when executed by a processor, configure the processor to perform the method of claim 1.

21. A computing apparatus comprising a processor and a memory having stored thereon instructions that, when executed by the processor, configure the apparatus to perform the method of claim 1.

* * * * *